Patented May 15, 1951

2,552,796

UNITED STATES PATENT OFFICE 2,552,796

THIOPHENE-SULFUR MONOCHLORIDE SYNTHETIC RESINS

Emil Koft, Jr., Woodbury Heights, N. J., assignor to Socony-Vacuum Oil Company, Incorporated, a corporation of New York No Drawing. Application March 23, 1950,
Serial No. 151,537

20 Claims. (Cl. 260—42)

This invention relates to the condensation of a thiophene compound with sulfur monochloride and, more particularly, is concerned with a method for preparing valuable synthetic resins by the condensation of thiophene and/or a substituted thiophene with sulfur monochloride.

Condensation reactions involving the union of two or more molecules to form new compounds of greater complexity and higher molecular weight are well known. The nature of the products obtained depends upon various reaction variables, including the type of reactants involved, the relative concentration of each and on the temperature, pressure, and time of reaction employed.

Reactions involving condensation form the basis of many processes for manufacturing synthetic resins. These synthetic resins may be liquids, semi-solids, or solids, depending upon the nature and conditions of the condensation reactions. However, they have the common characteristics of being amorphous, of having no tendency to crystallize and of possessing somewhat complex molecular structures.

In accordance with the present invention, it has been found that valuable synthetic resins may be prepared by condensing thiophene or a substituted derivative thereof with sulfur monochloride under controlled condensation reaction conditions.

It has also been found that valuable synthetic resins may be prepared by co-condensing thiophene and a substituted thiophene with sulfur monochloride under controlled reaction conditions.

As a result of the new condensation reaction between thiophene and/or a substituted thiophene with sulfur monochloride described herein, a liquid product, a rubber-like product, or a solid "popcorn" type product may be produced. These three products are modifications of the condensation reaction product that is formed and represent various stages of resinification. Accordingly, and without limiting the scope of this invention, the condensation of thiophene with sulfur monochloride taking place in accordance with the instant process may be postulated to proceed as follows:

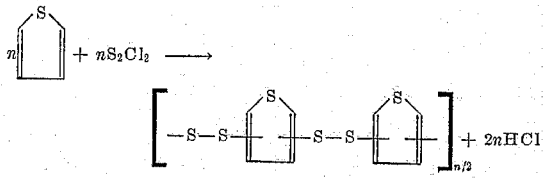

where $n$ represents the number of moles of reactants initially employed. Indications of this type of polymer formation can be deduced by comparing the sulfur content of the product formed with the sulfur content of the theoretical product, assuming a complete and typical condensation reaction has occurred. The presence of an excess of either reactant or a different reactive compound tends to act as a molecular weight stabilizer. The average degree of polymerization may be determined by the method of P. S. Flory described in Chemical Reviews 39, 171-3 (1946). While the comparatively simple mechanism set forth appears to account for the properties and nature of the resinous products obtained, the characteristics of some of the compositions indicated a much more complex and possibly cross-linked type product.

The degree of polymerization and the molecular weight of the product obtained depend upon a number of factors hereinafter discussed, it being obvious that the degree of polymerization will establish the stage of resinification achieved and thus determine whether the product obtained will be a liquid, a rubber-like mass, or a solid. Generally, the solid product is the ultimate stage of resinification, the liquid product being more or less the primary stage of resinification and the rubber-like mass representing the intermediate stages of resinification.

The nature of the products obtained in accordance with the procedure set forth herein further depends upon whether thiophene, mono-substituted thiophenes or di-substituted thiophenes are used in the condensation reactions. The thiophene reactant to be employed in the process of this invention may be designated by the general formula:

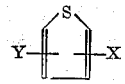

where X and Y represent substituents selected from hydrogen, halo, alkyl, and acyl radicals. Thus, thiophene and thiophene derivatives having one or two substituents of the foregoing type may be employed in the instant process. Representative thiophene reactants, accordingly, include: 2-chlorothiophene; 2-bromothiophene; 2-iodothiophene; 2-methylthiophene; 2-ethylthiophene; 2-propylthiophene; 2-butylthiophene; 2-octylthiophene; 2-oleylthiophene; 2-acetylthiophene; 2-stearylthiophene; 2,3-dimethylthiophene; 2-chloro-3-methylthiophene; 2-bromo-3-propylthiophene; 2-chloro-4-methylthiophene; 2- iodo-4-butylthiophene; 2-bromo-3-methylthiophene; 2,4-dimethylthiophene; 2-iodo-3-propylthiophene; 2 - methyl - 3 - ethylthiophene; 2-methyl-4-butylthiophene; 2-chloro-3-octylthiophene; 2-bromo-4-ethylthiophene; 3-methylthiophene; 3-propylthiophene; 2,5-di-t-butylthiophene; 2-t-octylthiophene; 2-t-butylthiophene; 2,5 - dichlorothiophene; 2,5 - dibromothiophene; 2,5-dimethylthiophene; 2-chloro - 5 - methylthiophene; 2-bromo-5-propylthiophene; 2-chloro-5-iodothiophene; 2-iodo - 5 - butylthiophene; 3,4-dimethyl thiophene; 3,4-dichlorothiophene; 3,4-dibromothiophene; 2,4-dichlorothiophene; 2,4-di-iodothiophene; and 2,4-dibromothiophene. It will be understood that the above specific reactants are given merely by way of examples and are not to be construed as limiting since other thiophene compounds falling with the scope of the above general formula, which will readily suggest themselves to those skilled in the art, may likewise be used.

While the ultimate size of the resin molecule produced in accordance with the instant invention is dependent primarily on the molecular ratio of reactants, it must be noted that with the use of substituted thiophene reactants, particularly in the case of di-substituted thiophenes and in accordance with the mechanism postulated hereinabove for the condensation of thiophene with sulfur monochloride, there are fewer active nuclear hydrogen atoms available and, therefore, it is more difficult to obtain high molecular weight condensation products than from thiophene and even mono-substituted thiophenes. However, it has been found that even with di-substituted thiophenes, resinification is achieved, particularly in those instances where one or both of the alpha hydrogen atoms of the thiophene ring are available for reaction.

The rate and control of the reaction contemplated by the present process depend upon a number of factors which may be summarized as follows:

1. Nature of the thiophene compounds used
2. Ratio of thiophene reactant to sulfur monochloride
3. Presence of a third reactive component
4. Temperature
5. Time These factors may vary in character or magnitude; therefore, they may be referred to more appropriately as reaction variables. It must be understood, however, that they are more or less interdependent. Therefore, when one is arbitrarily fixed, the limits within which the others may be varied are somewhat restricted. In any particular case, the most desirable variables can be readily ascertained by one skilled in the art, the limits within which these reaction variables may vary being indicated hereinafter.

The ratio of thiophene reactant to sulfur monochloride is an important feature of this invention. It has been found that a substantial excess of thiophene tends to inhibit the desired resin formation. Accordingly, it is not contemplated that a molar ratio of thiophene to sulfur monochloride of greater than 2 will be employed in the present process. Ordinarily, it is desirable to employ a reaction mixture in which thiophene and sulfur monochloride are present in a molecular proportion falling within the range varying between 2:1 and 1:2 so that the molar ratio of thiophene to sulfur monochloride is between 2 and 0.5. As a general rule, it has been found preferable to use a reaction mixture wherein thiophene and sulfur monochloride are present in substantially equimolar proportions.

The temperature and time of reaction to be employed in the method of the present invention must be carefully controlled to effect the requisite degree of condensation and to thereby afford the particular type of resin which it is desired to produce. The temperature may vary between room temperature and the boiling point of the highest boiling reactant employed. As a general rule, this temperature will ordinarily be between about 20° C. and about 150° C. and preferably between about 70° C. and about 130° C. The time of reaction will be sufficient to effect resinification and generally will be such as to produce a resinous product having a predetermined degree of polymerization. Ordinarily, the time of reaction will be within the range of 3 to 30 hours, depending largely upon whether a liquid, a rubber-like or a solid resinous product is desired.

In accordance with this invention, valuable synthetic resins may also be obtained by co-condensing, with sulfur monochloride, thiophene and substituted thiophenes characterized by the general formula:

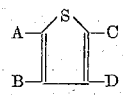

where at least one of the group A, B, C, D is a hydrogen atom and the remaining substituents are selected from hydrogen, halo, alkyl, and acyl radicals. The proportion of thiophene to substituted thiophene in the reaction charge may be varied over a wide range extending from mixtures consisting predominately of thiophene and containing only a minor amount of substituted thiophene to mixtures consisting predominately of substituted thiophene and containing only a minor amount of thiophene. The particular molar ratio of thiophene to substituted thiophene employed in co-condensation with sulfur monochloride will depend largely upon the desired physical characteristics of the resin produced therefrom. Ordinarily, however, the molar ratio of thiophene to substituted thiophene varies between 10:1 and 1:10, respectively. The reaction in this case likewise involves the use of a molar ratio of thiophene reactant (thiophene and substituted thiophene) to sulfur monochloride of not greater than 2, and preferably a molar ratio within the range of 2 to 0.5. As in the condensation of thiophene or substituted thiophene with sulfur monochloride, the conditions for co-condensation are carefully controlled. The procedure for effecting the co-condensation of thiophene and substituted thiophene with sulfur monochloride is similar to the procedure for effecting the condensation of thiophene with sulfur monochloride.

It is also within the purview of this invention to effect co-condensation of thiophene and a third reactive component with sulfur monochloride. The reactive components contemplated for co-condensation with thiophene include substituted phenolic type compounds having at least one hydrogen atom available for reaction, such as cresylic acids, and compounds such as water, alcohols, etc., which will react with the —$S_2Cl$ grouping and further modify the nature of the resinous product obtained. The molar proportions of thiophene and these reactive components and the conditions under which co-condensation with sulfur monochloride is carried out are essentially the same as those required for the co-condensation of thiophene and substituted thiophenes with sulfur monochloride, as set forth above.

In some instances, it has been found desirable as an aid in handling the reaction mixture to employ an inert diluent, such as benzene, toluene, and the like. It must be understood, however, that the reaction will proceed as well without the use of a diluent since the presence of such material does not alter the course of or take part in the condensation or co-condensation reaction between thiophene reactant and sulfur monochloride.

As stated hereinbefore, liquid resins, rubber-like resins, and solid resins may be produced by the process of this invention. These products have properties that make them amenable to a wide variety of commercial applications. The solubility characteristics of the products produced varied from soluble to complete insolubility in common organic solvents. The liquid resins can be used in the paint industry, in the manufacture of laminated products, and can be applied to surfaces readily without the use of diluents. The rubber-like and solid resins can be milled to produce a wide variety of thermosetting powders of varying degrees of comminution having considerable industrial application and can be washed, pressed, and extruded into any desired shape or form. The synthetic resins described herein can further be molded, cast, and comminuted into a wide variety of finished and intermediate products of great usefulness in industry.

The following detailed examples are for the purpose of illustrating modes of preparing the condensation products of this invention, it being clearly understood that the invention is not to be considered as limited to the specific reactants set forth hereinafter or to manipulations and conditions described in the examples. As will be apparent to those skilled in the art, a wide variety of other condensation products within the scope of this invention may be prepared by a suitable modification of the reactants.

EXAMPLE 1

*Reaction of thiophene and sulfur monochloride*

Eighty-four parts by weight of thiophene were introduced into a reaction vessel and heated to 70° C. with rapid stirring, 135 parts by weight of sulfur monochloride were added dropwise over a period of one hour and 20 minutes, while maintaining the temperature between 70° C. and 81° C. The molar ratio of thiophene to sulfur monochloride in the reaction mixture was 1. After all the sulfur monochloride had been added, the resulting reaction mixture was heated at a temperature of 84° C. for a period of 3½ hours. Upon standing overnight (about 15 hours), the reaction mixture set to a tough, tacky, tan resin. It was taken up in carbon disulfide and the mixture, upon washing with water, formed a yellow, spongy precipitate insoluble in the carbon disulfide. The carbon disulfide and precipitate were separated from the aqueous portion and the carbon disulfide was removed by evaporation. The yellow, rubbery material was water-washed until the washings were neutral and the resultant product was then dried to yield 188 parts by weight of a yellow, rubber-like resin.

EXAMPLE 2

*Reaction of thiophene and sulfur monochloride in benzene*

One hundred thirty-five parts by weight of sulfur monochloride were placed in a reaction vessel and heated to 80° C. A mixture of 105 parts by weight of thiophene and 250 parts by weight of a diluent of benzene were added dropwise to the sulfur monochloride over a period of one hour, the temperature being maintained between 74° C. and 80° C. The molar ratio of thiophene to sulfur monochloride in the reaction mixture was 1.25. After the aforementioned addition, heating was continued within the temperature range of 83–86° C. for 5 hours and 20 minutes. Vigorous evolution of hydrogen chloride gas was noted during the course of the reaction. Upon allowing the reaction mixture to stand approximately 15 hours, a light brown solid separated. The reaction product was then washed with water and the liquid organic layer was separated from the aqueous and solid portions. The organic layer was water-washed until neutral and benzene was removed therefrom by evaporation. The residue so obtained consisted of 32 parts by weight of a light brown, tacky resin. The solid gummy portion, previously separated from the liquid organic layer, was water-washed until neutral and dried to yield 105 parts by weight of a light tan, rubber-like resin, the combined resin yield thereby amounting to 137 parts by weight.

EXAMPLE 3

*Reaction of thiophene, sulfur monochloride and 2-chlorothiophene in benzene*

One hundred thirty-five parts by weight of sulfur monochloride were placed in a reaction vessel and heated to 75° C. A mixture of 84 parts by weight of thiophene, 24 parts by weight of 2-chlorothiophene, and a diluent of 150 parts by weight of benzene were added dropwise to the sulfur monochloride over a period of 45 minutes. The molar ratio of thiophene, sulfur monochloride, and 2-chlorothiophene in the reaction mixture was 1:1:0.2, respectively. Hydrogen chloride gas was given off during the aforesaid addition and heating was then continued for an additional 3½ hours. The resulting reaction product mixture was permitted to stand about 15 hours at room temperature and thereafter was heated at a temperature within the range 77–82° C. for 12½ hours. At the end of this time, a rubbery solid separated from the benzene layer. The reaction mixture was washed with ice water and the solid portion was separated from the benzene-soluble layer. The benzene-soluble material, after water-washing, yielded 47 parts by weight of a yellow, rubbery resin. The benzene-insoluble portion, after water-washing and drying, yielded 90 parts by weight of a yellow, rubbery plastic, the total yield of resin thereby amounting to 137 parts by weight.

EXAMPLE 4

*Reaction of 3-methylthiophene with sulfur monochloride in toluene*

One hundred twenty-three parts by weight of 3-methylthiophene and 200 parts by weight of a diluent of toluene were placed in a reaction vessel and heated to 100° C. One hundred thirty-five parts by weight of sulfur monochloride were then added slowly to a reaction vessel over a period of 1.5 hours, maintaining the reaction temperature within the range of 100–108° C. The molar ratio of 3-methylthiophene to sulfur monochloride in the reaction mixture was 1.25. After the addition of sulfur monochloride was completed, heating was continued for 3.5 hours and the mixture was allowed to stand overnight (about 15 hours). The reaction mixture was then heated for 6 hours at 108° C. and thereafter cooled and poured into 200 grams of ice. After water-washing the reaction mixture, toluene was removed therefrom by distillation, yielding a viscous, tacky brown oil amounting to 175 parts by weight.

EXAMPLE 5

*Reaction of thiophene, sulfur monochloride and cresylic acid in benzene*

One hundred thirty-five parts by weight of sulfur monochloride were placed in a reaction vessel and heated to 80° C. A mixture of 84 parts by weight of thiophene and a diluent of 100 parts by weight of benzene was added dropwise over a period of 135 minutes. After 2 hours at 80° C., 27 parts by weight of cresylic acid were then added to the reaction mixture over a period of 25 minutes. The reaction mixture was then treated as described in the previous examples, yielding 173 parts by weight of a black, granular product.

Examples 6 to 18, inclusive, illustrate the fact that under the condensation conditions described herein, it is possible to effect the condensation of thiophene and/or substituted thiophene with sulfur monochloride and that the proportion of thiophene compound to sulfur monochloride in the reaction mixture may vary within the limits discussed hereinabove. The procedural steps of Examples 6–18, inclusive are similar to those set forth in Examples 1–5. For convenience, the data of Examples 6–18, inclusive, are set forth in the following table:

From the foregoing examples, it will be apparent that a variety of resinous products may be produced by condensation of thiophene and/or a substituted thiophene with sulfur monochloride. The present invention may be embodied in other specific forms without departing from the spirit or essential attributes thereof and it is therefore desired that the embodiments set forth in the preceding examples be considered in all respects as illustrative and not restrictive, reference being had to the appended claims, rather than the foregoing description, to indicate the scope of the invention.

I claim:

1. The method of preparing resinous synthetic products, which comprises reacting a thiophene compound having the general formula:

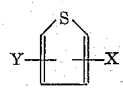

where X and Y are substituents selected from the group consisting of hydrogen, halo, alkyl, and acyl radicals with sulfur monochloride in a molar ratio corresponding to not more than 2 moles of thiophene compound for each mole of sulfur monochloride.

2. The method of preparing resinous synthetic products, which comprises reacting a thiophene compound having the general formula:

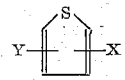

where X and Y are substituents selected from the group consisting of hydrogen, halo, alkyl, and acyl radicals with sulfur monochloride in a reaction mixture wherein the molar ratio of thiophene compound to sulfur monochloride is between 2 and 0.5.

| Example | Reactants, moles | | | Diluent | Temperature, °C. | Time (hours) | Yield | |
|---|---|---|---|---|---|---|---|---|
| | Thiophene | Substituted thiophene | $S_2Cl_2$ | | | | Crude (Gms.) | Theoretical (Gms.) |
| 6 | 1.25 | | 1 | Benzene | 78–80 | 8 | 154 | 167 |
| 7 | 1.6 | | 1 | do | 75–80 | 11.5 | 180 | 197 |
| 8 | | 1.15, 2-Methylthiophene | 1 | | 73–100 | 9.5 | 155 | 175 |
| 9 | | 0.6, Di-t-butylthiophene | 0.5 | | 128–132 | 13 | 105 | 149 |
| 10 | | 0.6, 2-Acetylthiophene | 0.5 | Benzene | 75–83 | 14.5 | 105 | 106.6 |
| 11 | | 0.6, 2-Chlorothiophene | 0.5 | do | 76–84 | 19 | 62 | 102 |
| 12 | | 0.6, 2,5-Dichlorothiophene | 0.5 | do | 78–84 | 20.5 | 10 | 122.8 |
| 13 | 1 | 0.25, 2-Chlorothiophene | 1 | do | 78–80 | 15 | 164 | 176 |
| 14 | 1 | 0.25, 2-Acetylthiophene | 1 | do | 75–80 | 13 | 160 | 178 |
| 15 | 1 | 0.25, 2-Oleylthiophene | 1 | do | 74–80 | 19 | 206 | 233 |
| 16 | 1 | 0.25, 2-Methylthiophene | 1 | do | 80 | 6 | 160 | 171 |
| 17 | 1 | 0.25, 2-t-butylthiophene | 1 | do | 80 | 11.5 | 167 | 181 |
| 18 | 1 | 0.25, 2-t-octylthiophene | 1 | do | 80 | 11.5 | 169 | 195 |

| Example | Nature of Product | Theoretical Polymer Units [1] | Analysis | | | |
|---|---|---|---|---|---|---|
| | | | Theoretical | | Found | |
| | | | Per Cent Sulfur | Per Cent Cl | Per Cent Sulfur | Per Cent Cl |
| 6 | Slightly granular, yellow and rubbery | 9 | 62.3 | | 61.24 | |
| 7 | Rubbery, tan resin | 4–5 | 59.5 | 0 | 58.8 | 1.96 |
| 8 | Tacky, black resin | 14–15 | 57.8 | | 58.9 | |
| 9 | Dark oily liquid | 3 | 28.2 | | 29.1 | |
| 10 | Black, plastic resin | 11 | 48 | | 39.3 | |
| 11 | Brown, oily liquid | 11 | 50.1 | | 54.4 | |
| 12 | Black resin | | | | 78.9 | |
| 13 | Plastic, yellow, rubber-like | 9 | 59.2 | 5.05 | 57.4 | 5.27 |
| 14 | Plastic, black resin | 9 | 58.5 | | 57.4 | |
| 15 | Black, rubber-like | 9 | 44.6 | | 40.9 | |
| 16 | Brown, rubbery product | 9 | 61.0 | | 61.4 | |
| 17 | Yellow, rubbery plastic | 9 | 57.4 | | 52.5 | |
| 18 | Brown, tacky plastic | 9 | 53.3 | | 51.5 | |

[1] Calculated [Chem. Rev., 39, 171–3 (1946)].

3. The method of preparing resinous synthetic products, which comprises reacting a thiophene compound having the general formula:

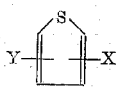

where X and Y are substituents selected from the group consisting of hydrogen, halo, alkyl, and acyl radicals with sulfur monochloride in a reaction mixture wherein thiophene compound and sulfur monochloride are present in substantially equimolar proportions.

4. The method of preparing resinous synthetic products, which comprises reacting a thiophene compound having the general formula:

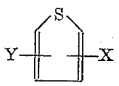

where X and Y are substituents selected from the group consisting of hydrogen, halo, alkyl, and acyl radicals with sulfur monochloride in a molar ratio corresponding to not more than 2 moles of thiophene compound for each mole of sulfur monochloride at a temperature between about 20° C. and about 150° C. for a period of time sufficient to effect resinification.

5. The method of preparing resinous synthetic products, which comprises reacting a thiophene compound having the general formula:

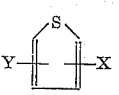

where X and Y are substituents selected from the group consisting of hydrogen, halo, alkyl, and acyl radicals with sulfur monochloride in a reaction mixture wherein the molar ratio of thiophene compound to sulfur monochloride is between 2 and 0.5 at a temperature between about 70° C. and about 130° C. for a period of time sufficient to effect resinification.

6. The method of preparing resinous synthetic products, which comprises reacting thiophene with sulfur monochloride in a molar ratio corresponding to not more than 2 moles of thiophene for each mole of sulfur monochloride.

7. The method of preparing resinous synthetic products, which comprises reacting thiophene and sulfur monochloride in a reaction mixture wherein the molar ratio of thiophene to sulfur monochloride is between 2 and 0.5 at a temperature between about 20° C. and about 150° C. for a period of time to effect resinification.

8. The method of preparing resinous synthetic products, which comprises reacting a mono-substituted thiophene having a substituent selected from the group consisting of halo, alkyl, and acyl radicals with sulfur monochloride in a molar ratio corresponding to not more than 2 moles of said substituted thiophene for each mole of sulfur monochloride.

9. The method of preparing resinous synthetic products, which comprises reacting monoalkyl thiophene with sulfur monochloride in a molar ratio corresponding to not more than 2 moles of monoalkyl thiophene for each mole of sulfur monochloride at a temperature between about 20° C. and about 150° C. for a period of time sufficient to effect resinification.

10. The method of preparing resinous synthetic products, which comprises reacting monohalothiophene with sulfur monochloride in a molar ratio corresponding to not more than 2 moles of monohalothiophene for each mole of sulfur monochloride at a temperature between about 20 and about 150° C. for a period of time sufficient to effect resinification.

11. A method of preparing resinous synthetic products, which comprises reacting monoacyl thiophene with sulfur monochloride in a molar ratio corresponding to not more than 2 moles of monoacyl thiophene for each mole of sulfur monochloride at a temperature between about 20° C. and about 150° C. for a period of time sufficient to effect resinification.

12. The product obtained by reacting a thiophene compound having the formula:

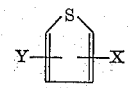

where X and Y are substituents selected from the group consisting of hydrogen, halo, alkyl, and acyl radicals with sulfur monochloride in a molar ratio corresponding to not more than 2 moles of thiophene compounds for each mole of sulfur monochloride.

13. The product obtained by reacting thiophene with sulfur monochloride in a molar ratio corresponding to not more than 2 moles of thiophene for each mole of sulfur monochloride at a temperature between about 20° C. and about 150° C. for a period of time sufficient to effect resinification.

14. The product obtained by reacting a monosubstituted thiophene having a substituent selected from the group consisting of halo, alkyl, and acyl radicals with sulfur monochloride in a molar ratio corresponding to not more than 2 moles of thiophene for each mole of sulfur monochloride at a temperature between about 20° C. and about 150° C. for a period of time sufficient to effect resinification.

15. The method of preparing resinous synthetic products, which comprises reacting a mixture of thiophene and a substituted thiophene having a nuclear hydrogen atom available and having at least one of the remaining nuclear hydrogen atoms replaced by a substituent selected from the group consisting of halo, alkyl and acyl radicals, wherein the molar ratio of thiophene to substituted thiophene is between about 10:1 and 1:10, with sulfur monochloride in a molar ratio corresponding to not more than 2 moles of the foregoing mixture for each mole of sulfur monochloride.

16. The method of preparing resinous synthetic products, which comprises reacting a mixture of thiophene and substituted thiophene characterized by the formula:

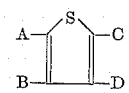

where at least one of the group A, B, C, D is a hydrogen atom and the remaining substituents are selected from the group consisting of hydrogen, halo, alkyl, and acyl radicals, wherein the molar ratio of thiophene to said substituted thiophene is about 10:1 and 1:10, with sulfur monochloride in a reaction mixture wherein the molar ratio of the foregoing mixture of thiophene and substituted thiophene to sulfur monochloride is between 2 and 0.5 at a temperature between about 20° C. and about 150° C. for a period of time sufficient to effect resinification.

17. The method of preparing resinous synthetic products, which comprises reacting a mixture of thiophene and cresylic acid, wherein the molar ratio of thiophene to cresylic acid is between about 10:1 and 1:10, with sulfur monochloride in a molar ratio corresponding to not more than 2 moles of the foregoing mixture of thiophene and cresylic acid for each mole of sulfur monochloride.

18. The product obtained by reacting a mixture of thiophene and a substituted thiophene having a nuclear hydrogen atom available and having at least one of the remaining nuclear hydrogen atoms replaced by a substituent selected from the group consisting of halo, alkyl, and acyl radicals, wherein the molar ratio of thiophene to substituted thiophene is between about 10:1 and 1:10, with sulfur monochloride in a molar ratio corresponding to not more than 2 moles of the foregoing mixture for each mole of sulfur monochloride.

19. The product obtained by reacting a mixture of thiophene and substituted thiophene characterized by the formula:

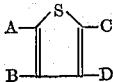

where at least one of the group A, B, C, D is a hydrogen atom and the remaining substituents are selected from the group consisting of hydrogen, halo, alkyl, and acyl radicals, wherein the molar ratio of thiophene to said substituted thiophene is about 10:1 and 1:10, with sulfur monochloride in a reaction mixture wherein the molar ratio of the foregoing mixture of thiophene and substituted thiophene to sulfur monochloride is between 2 and 0.5 at a temperature between about 20° C. and about 150° C. for a period of time sufficient to effect resinification.

20. The product obtained by reacting a mixture of thiophene and cresylic acid, wherein the molar ratio of thiophene to cresylic acid is between about 10:1 and 1:10, with sulfur monochloride in a molar ratio corresponding to not more than 2 moles of the foregoing mixture of thiophene and cresylic acid for each mole of sulfur monochloride.

EMIL KOFT, Jr.

No references cited.